Oct. 28, 1958 D. M. CURRAN 2,857,691
PIPELINE DITCH FILLING AND PIPE PADDING MACHINE
Filed Feb. 13, 1956 2 Sheets-Sheet 1
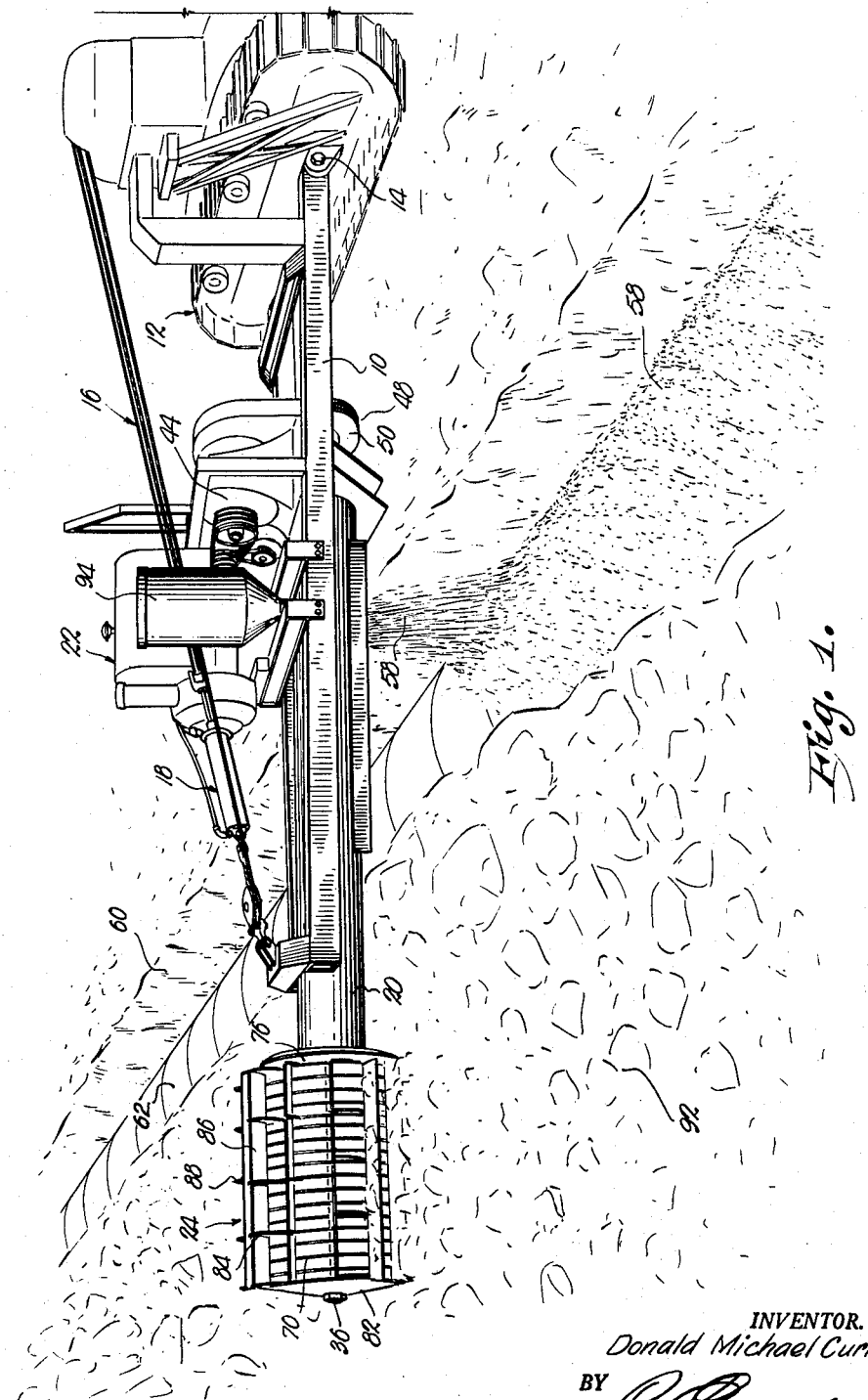
INVENTOR.
Donald Michael Curran
BY
ATTORNEY.

Oct. 28, 1958     D. M. CURRAN     2,857,691
PIPELINE DITCH FILLING AND PIPE PADDING MACHINE
Filed Feb. 13, 1956     2 Sheets-Sheet 2

INVENTOR.
Donald Michael Curran
BY
ATTORNEY.

United States Patent Office 2,857,691
Patented Oct. 28, 1958

2,857,691

PIPELINE DITCH FILLING AND PIPE PADDING MACHINE

Donald Michael Curran, Tulsa, Okla., assignor to M. J. Crose Manufacturing Company, Inc., Tulsa, Okla.

Application February 13, 1956, Serial No. 565,002

2 Claims. (Cl. 37—144)

This invention relates to improvements in earth and material handling equipment and has for its primary object the provision of a pipeline ditch filling and pipe padding machine provided with a novel, rotatable head for digging into dirt, sifting out coarse material and directing the same to a conveyor or the like for feeding the fine substances to the ditch, not only prior to laying of the pipe therein but upon the pipe to present a pad for protecting the pipe against damage from rocks and other materials during the subsequent ditch filling operation.

It is the most important object of the present invention to provide in a machine of the aforementioned character a self-cleaning and self-loading cage or head in the nature of a "grizzly" and having as a part thereof a sieve for automatically sifting out coarse materials as the head rotates and digs into the backfill of a ditch to be filled.

Another important object of the instant invention is to combine in a novel way the aforementioned head with a conveyor, preferably in the nature of an auger mounted within a tube for transferring the sifted dirt from the head along the tube to an outlet in the latter, and to utilize the tube as a means for rotatably supporting the head in circumscribing relationship to the tube.

A further object of the present invention is to provide novel drive means for the head and the auger that includes relatively telescoped shafts in the tube, one of which is driven at one end of the tube for rotating the auger and the other being driven from the same prime mover to drive the head.

A still further object of the present invention is to combine all of the aforementioned components with a tractor or other vehicle having a lateral boom upon which the tube is mounted, to the end that the revolving head may be raised and lowered by virtue of lifting apparatus forming a part of the tractor and operably coupled with the boom.

Other objects include the way in which the inlet for the dirt receiving tube is formed at the top and at one end of the latter and is provided with a hopper within the head for receiving the dirt; the way in which the hollow head is formed by the provision of a plurality of spaced rings in interconnected relationship and circumscribing the tube concentrically to the latter to present the said sieve or sifting means; the way in which the rings are interconnected by scoops for lifting the dirt to a position where the same will dump into the hopper automatically; and the manner of providing digging teeth on the head and preferably as an integral outwardly extending part of the sieve rings.

In the drawings:

Figure 1 is a fragmentary perspective view of a pipeline ditch filling and pipe padding machine made pursuant to the present invention.

Figure 4:
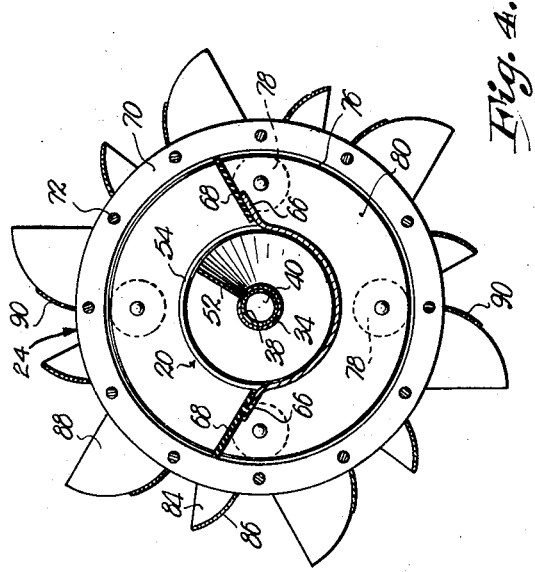
Fig. 4 is a transverse cross-sectional view taken on line IV—IV of Fig. 3.
Figure 3:
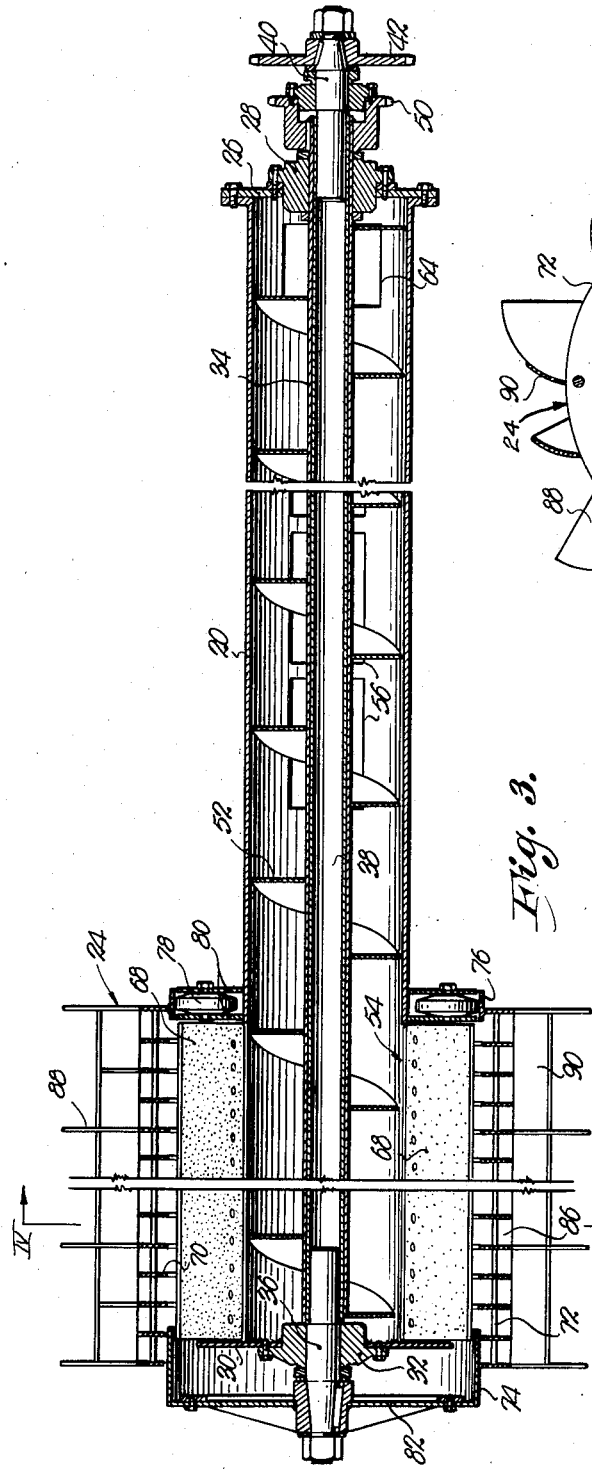
Fig. 3 is an enlarged horizontal longitudinal cross-sectional view through the conveyor and head entirely removed from the boom which normally supports the same.

The machine about to be described may be mounted on any suitable support but preferably on a lateral boom 10 of a mobile vehicle such as a tractor, a crawler type tractor 12 being chosen for illustration in Fig. 1 of the drawings. The vertically swingable boom is pivotally connected to the tractor 12 by normally horizontal pivot means 14, and block and tackle means broadly designated by the numeral 16 has been chosen for illustration as one means for raising and lowering the boom 10. To this end a power winch (not shown) on the tractor 12 controls the block and tackle means 16 and minute adjustments may be made by actuation of a hydraulic piston and cylinder assembly 18 interposed within the lifting structure 16.

Boom 10 supports an elongated tube 20 together with a prime mover 22 at the innermost end of the tube 20. Tube 20 in turn rotatably supports a cage broadly designated by the numeral 24 at the outermost end of the tube 20 in circumscribing relationship to the latter.

A closure 26 mounted on the innermost end of the tube 20 supports a bearing 28 and a closure plate 30 for the outermost end of the tube 20 supports a bearing 32, it being noted that the diameter of the plate 30 is greater than the outside diameter of the tube 20 but less than the inside diameter of the cage 24 for purposes hereinafter to be made clear.

Figure 2:
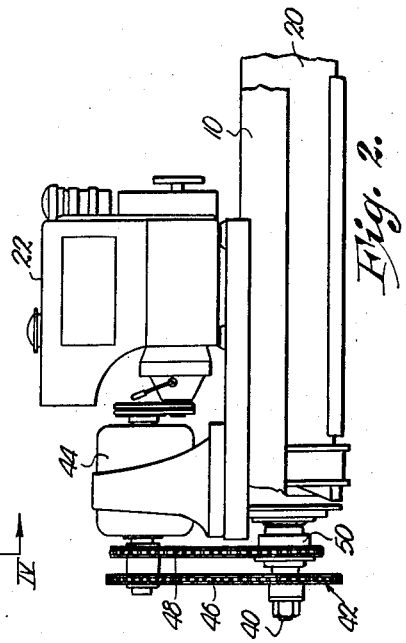
Fig. 2 is a fragmentary elevational view showing particularly the prime mover for the rotatable head and the auger and the manner of operable connection therewith.

The two bearings 28 and 32 journal a tubular shaft 34 and a stub shaft 36 respectively, the shaft 36 being rigid to a second tubular shaft 38 within the outermost end of the latter. Shaft 38 is rotatably telescoped within the shaft 34 and has a second stub shaft 40 extending into the innermost end thereof and rigidly connected thereto. The tubular shaft 38 and the two stub shafts 36 and 40 are driven as a unit through the medium of a sprocket wheel 42 secured to stub shaft 40 and operably connected with speed reducer 44 by a continuous chain 46, it being noted in Fig. 2 of the drawing that the speed reducer 44 is operably connected with the prime mover 22. The outermost shaft 34 is likewise driven from the speed reducer 44 through the medium of a continuous chain 48 trained around a sprocket wheel 50 rigidly joined to the innermost end of the shaft 34 and rotatable about the stub shaft 40. An auger type conveyor 52 within the tube 20 and coextensive in length therewith is coiled about the shaft 34 and secured thereto for rotation therewith, its purpose being to move dirt from inlet 54 to one or more outlets 56 in the tube 20, such dirt 58 being shown in Fig. 1 gravitating from the tube 20 into a ditch 60 and upon a pipeline 62 within the ditch 60. An auxiliary port 64 at the innermost end of the tube 20 is provided to receive excess dirt and prevent jamming in the event that the outlets 56 are unable to accommodate the full supply being fed thereto by the conveyor 52.

The outlets 56 and 64 are all formed in the bottom of the tube 20, whereas the inlet 54 is at the top of the tube 20 and within the cage 24. Tube 20 is substantially semi-circular at the outermost end thereof within the cage 24, as seen in Fig. 4 of the drawings, and is flared outwardly in a pair of lips 66 having elongated flaps 68 secured thereto, the flaps 68 converging as the conveyor 52 is approached, thereby presenting a hopper within the cage 24 for receiving the dirt, as hereinafter to be made clear.

The cage 24 includes a plurality of spaced apart, preferably parallel rings 70 having inside diameters appreciably greater than the outside diameter of the tube 20 and disposed in concentric circumscribing relationship to the latter at the inlet 54. Rings 70 are interconnected by through rods 72 and the entire unit is mounted rigidly to a pair of spaced circular bands 74 and 76 which the outermost rings 70 surround. The band 76 circumscribes and is supported by a plurality of rollers 78 that are in turn supported by spaced discs 80 which surround and are secured rigidly to the tube 20.

The band 74 is provided with a closure 82 that is in turn rigidly secured to the stub shaft 36, thereby operably connecting the cage 24 with the shaft 38 and therefore, the prime mover 22.

The outermost edges of certain of the rings 70 are provided with relatively short integral ears 84 to which are secured elongated, transversely arcuate scoops 86 having the innermost edges thereof bearing directly against all of the outermost edges of the rings 70. In a similar manner appreciably longer ears 88 integral with the outermost edges of certain of the rings 70 are interconnected by arcuate scoops 90, it being noted that the ears 88 extend outwardly beyond the outermost edges of the scoops 90 to present a plurality of digging teeth for the cage or head 24. The teeth or ears 88 may be arranged in any manner as desired by the manufacturer, but it is preferred that the same be staggered throughout the length and circumference of the rotatable head 24.

As seen in Fig. 1 of the drawings, the source of dirt 58 is preferably from backfill 92 but, by virtue of the fact that the assembly will operate at any angle upon raising or lowering of the boom 10, such dirt 58 may be dug from other sources as may be desired or become necessary.

As the vehicle 12 is advanced along the ditch 60 and the head 24 lowered into the backfill 92, the prime mover 22 is energized to continually rotate the auger 52 as well as the cage 24, the auger 52 rotating at an appreciably greater speed than the cage 24 by virtue of the operable connection between shafts 34 and 38 and the gear reducer 44.

During rotation of the cage 24 the teeth 88 thereof tend to dig into and loosen the material of the backfill 92 and such material is carried upwardly to a position above the hopper 68—68 by the scoops 86 and 90 as the auger 52 rotates clockwise, viewing Fig. 4.

The plurality of spaced apart rings 70 present a sieve for sifting out coarse particles such as rock and large clods or lumps, permitting passage only of relatively fine dirt 58 through the rings 70 and into the hopper 68—68 which collects the dirt 58 and directs the same into the tube 20 through the inlet 54 of the latter.

The closure 30 and the innermost of the plates 80 cooperate with the flaps 68—68 in confining the dirt 58 to a uniform flow into the tube 20, it being noted that the resilient flaps 68—68 wipe along the innermost edges of the rings 70 as the latter rotate with respect to the tube 20 and the flaps 68—68.

Manifestly, it is contemplated that the machine be used initially to pad the bottom of the pipeline ditch 60 with rock-free earth before the coated pipe 62 is lowered into the ditch 60, whereby to protect the pipe 62 and particularly the coating thereon from any damage caused by rocks or other large sharp objects that would likely be in the bottom of the ditch. The machine is more specially adapted, however, for the purpose of padding the top of the pipe 62 and thereby protect it from damage resulting from final filling operations. Heretofore it has been necessary to manually pad the pipe 62 with sheets of suitable material and such protecting step has been time consuming and expensive.

It is seen that the cage 24 is not only self-cleaning but self-loading and is capable of rejecting all rocks or other coarse material, thereby feeding only fine soft dirt 58 to the pipe 62 as the vehicle 12 moves along the ditch 60.

In many instances it may be necessary or desirable to stabilize the fill around the pipe 62 within the ditch 60 and, therefore, there is illustrated in Fig. 1 of the drawing a container 94 communicating with the pipe 20 for receiving cement or other stabilizing material. The container 94 is provided with feeding mechanism (not shown) for controlling the flow of cement therefrom to the tube 20 and it has been found that if approximately one part of cement to twenty parts of the fill dirt 58 is directed to the pipe 62, the latter will not tend to shift as water drains into and along the ditch 60, particularly following the laying of the pipeline and prior to complete and full settling of the fill dirt therearound.

Having thus described the invention what is claimed as new and desired to be secured by Letters Patent is:

1. In combination with a vehicle having a vertically swingable boom, a susbtantially horizontal tube mounted on the boom and provided with an inlet in the top thereof at one end of the tube, there being an outlet in the bottom of the tube; an auger in the tube for conveying dirt from the inlet to the outlet; and a hollow, slotted head rotatably mounted on the tube in circumscribing relationship thereto, enclosing said inlet, said head being provided with scoops for digging the dirt and dumping the same into the inlet as the head is rotated.

2. In combination with a vehicle having a vertically swingable boom, a substantially horizontal tube mounted on the boom and provided with an inlet in the top thereof at one end of the tube, there being an outlet in the bottom of the tube; an auger in the tube for conveying dirt from the inlet to the outlet; a hollow, slotted head rotatably mounted on the tube in circumscribing relationship thereto, enclosing said inlet, said head being provided with scoops for digging the dirt and dumping the same into the inlet as the head is rotated; and power means carried by the boom for swinging movement therewith and operably connected with the auger and with the head for rotating the same.

References Cited in the file of this patent

UNITED STATES PATENTS

| | | |
|---|---|---|
| 111,604 | Bailey | Feb. 7, 1871 |
| 1,004,715 | Valiquett et al. | Oct. 3, 1911 |
| 1,658,398 | Seaman | Feb. 7, 1928 |
| 1,677,342 | Hodgen | July 17, 1928 |
| 1,721,392 | Heumann | July 16, 1929 |
| 1,721,587 | Burchill | July 23, 1929 |
| 1,972,385 | Hutton | Sept. 4, 1934 |
| 2,270,703 | Bernard | Jan. 20, 1942 |

FOREIGN PATENTS

| | | |
|---|---|---|
| 7,246 | Netherlands | July 15, 1922 |